(12) United States Patent
Nishitani et al.

(10) Patent No.: US 9,405,390 B2
(45) Date of Patent: Aug. 2, 2016

(54) OBJECT SELECTION FOR COMPUTER DISPLAY SCREEN

(71) Applicant: International Business Machines Corporation, Armonk, NY (US)

(72) Inventors: Yusuke Nishitani, Tokyo (JP); Munetaka Ohtani, Kanagawa-ken (JP); Yoshinori Tahara, Kanagawa (JP); Asuka Unno, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/540,472

(22) Filed: Nov. 13, 2014

(65) Prior Publication Data

US 2015/0169095 A1   Jun. 18, 2015

(30) Foreign Application Priority Data

Dec. 18, 2013 (JP) ................................. 2013-261048

(51) Int. Cl.
*G06F 3/041* (2006.01)
*G06F 3/048* (2013.01)
*G06F 3/044* (2006.01)

(52) U.S. Cl.
CPC ............... *G06F 3/041* (2013.01); *G06F 3/044* (2013.01); *G06F 3/048* (2013.01)

(58) Field of Classification Search
CPC .......................................... G06F 3/041–3/048
USPC ..................... 345/173–178; 178/18.01–18.11
See application file for complete search history.

(56) References Cited

U.S. PATENT DOCUMENTS

| | | | | |
|---|---|---|---|---|
| 8,134,597 B2* | 3/2012 | Thorn | ..................... | G03B 13/32 345/169 |
| 8,386,927 B1* | 2/2013 | Franklin | ............... | G06F 3/0488 715/701 |
| 8,407,608 B1* | 3/2013 | Franklin | ............. | G06F 15/0291 715/756 |
| 2010/0054602 A1* | 3/2010 | Kaehler | ............. | G06K 9/00429 382/186 |
| 2010/0141826 A1* | 6/2010 | Thorn | ..................... | G03B 13/32 348/345 |
| 2011/0083089 A1* | 4/2011 | Pahud | ................... | G06F 3/0425 715/765 |
| 2012/0113001 A1* | 5/2012 | Yamauchi | ............... | G06F 3/038 345/157 |
| 2012/0120002 A1* | 5/2012 | Ota | ........................ | G06F 3/0488 345/173 |
| 2012/0133484 A1* | 5/2012 | Griffin | .................... | G06F 21/51 340/5.54 |
| 2014/0025263 A1* | 1/2014 | Geyer | .................... | G60K 35/00 701/49 |
| 2014/0229342 A1* | 8/2014 | Marlowe | ............ | G06Q 30/0282 705/27.2 |

FOREIGN PATENT DOCUMENTS

| JP | 2006011914 A | 1/2006 |
|---|---|---|
| JP | 4045550 B2 | 2/2008 |
| JP | 2012058882 A | 3/2012 |

* cited by examiner

*Primary Examiner* — Dmitriy Bolotin
(74) *Attorney, Agent, or Firm* — Cantor Colburn LLP (57) ABSTRACT

Embodiments relate to selecting an object to display from an information processing device connected in a manner enabling the exchange of data to a touch panel having a display function. An aspect includes entering a trajectory extension mode in response to the user moving a finger over the touch panel at a speed equal to or greater than a predetermined speed. Another aspect includes extending and displaying a trajectory of the finger in response to the speed of the moving finger detected in the trajectory extension mode. Yet another aspect includes placing an object located at an end point of the extended trajectory on the touch panel in a selected state.

13 Claims, 13 Drawing Sheets

OBJECT SELECTION FOR COMPUTER DISPLAY SCREEN

BACKGROUND

The present disclosure relates generally to a method of selecting objects displayed on a display screen and, more specifically, to a method, device and computer program for indicating, selecting and acquiring an object when the object is some distance from the object indicating means.

In recent years, many different information processing devices have been developed that include touch panels. A touch panel can be used to intuitively manipulate information through direct contact with the display. Also, a single hand can be used to select and manipulate objects. However, when there is some distance between the object to be touched and a finger, the device may have to be held a different way and another hand may be required to make the selection.

SUMMARY

Embodiments relate to selecting an object to display from an information processing device connected in a manner enabling the exchange of data to a touch panel having a display function. An aspect includes entering a trajectory extension mode in response to the user moving a finger over the touch panel at a speed equal to or greater than a predetermined speed. Another aspect includes extending and displaying a trajectory of the finger in response to the speed of the moving finger detected in the trajectory extension mode. Yet another aspect includes placing an object located at an end point of the extended trajectory on the touch panel in a selected state.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DRAWINGS

Various embodiments will now be described, by way of example only, with reference to the following drawings in which.

DETAILED DESCRIPTION

A method, device and computer program able to select and manipulate objects in a highly intuitive manner are provided. A method, device, and computer program able to select an object at a distant position are also provided. A method, device, and computer program able to extend the path of a cursor used to select objects on the basis of the speed at which an object indicating means is being operated are also provided. A method, device, and computer program allowing a region including a distant object to be dragged closer and the object inside the region to be selected are also provided.

Embodiments of object selection include selecting an object to display from an information processing device connected in a manner enabling the exchange of data to a touch panel having a display function, the method comprising: entering trajectory extension mode in response to the user moving a finger over the touch panel at a speed equal to or greater than a predetermined speed; extending and displaying the trajectory of the finger in response to the speed of the moving finger in trajectory extension mode; and placing the object at the end point of the extended trajectory in a selected state. Embodiments of object selection may also include making fine adjustments to the end point of the trajectory in response to further movement of the user's finger over the touch pad while in the selected state. Embodiments of object selection may also include extracting a default range for the end point of the trajectory and displaying the default range near the finger in response to a dragging operation performed by the user's finger after fine adjustment. Embodiments of the displaying may also coordinate the trajectory of the finger with the extended trajectory.

Figure 1:
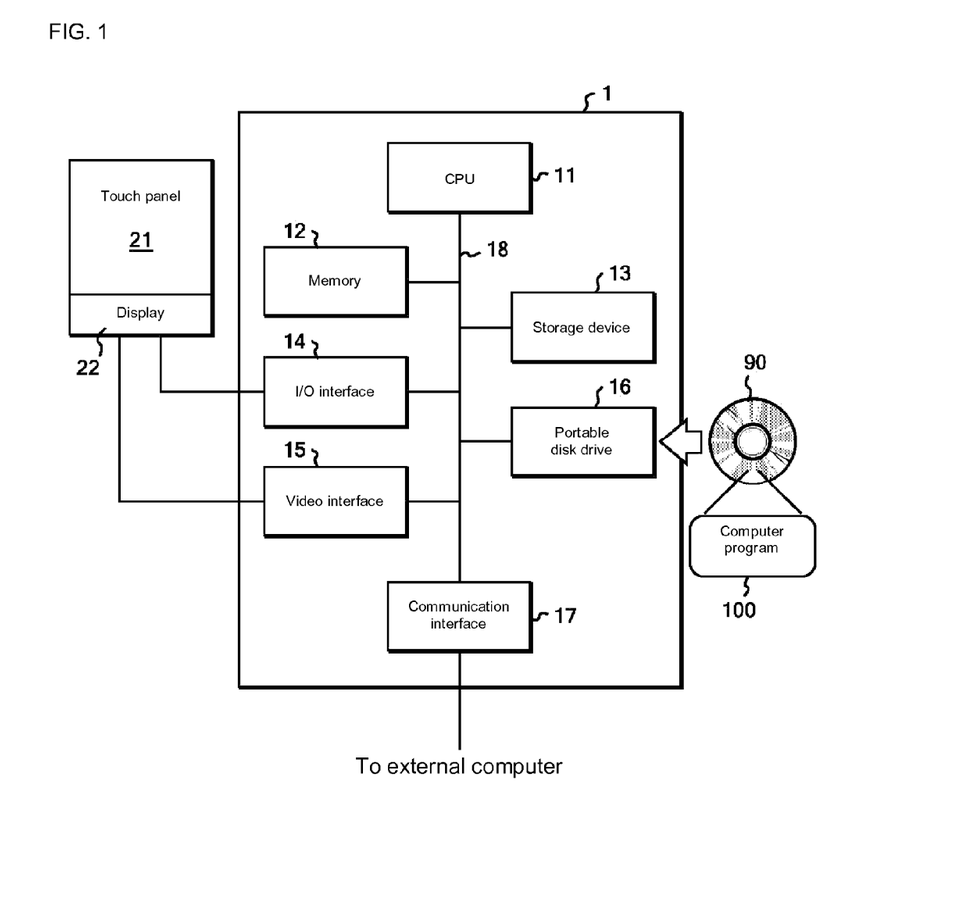
FIG. 1 is a block diagram showing the configuration of the information processing device 1 in an embodiment.

FIG. 1 is a block diagram showing the configuration of the information processing device 1 in an embodiment. In the embodiment, the information processing device 1 includes a central processing unit (CPU) 11, memory 12, a storage device 13, an I/O interface 14, a video interface 15, a disk drive 16, a communication interface 17, and an internal bus 18 for connecting the hardware.

The CPU 11 is connected to each hardware component in the information processing device 1 via the internal bus 18 to control the operation of the various hardware components and to perform various software functions in accordance with computer programs 100 stored in the storage device. The memory 12 is used to extend load modules when a computer program 100 is being executed, and to store temporary data generated when a computer program 100 is being executed.

The storage device 13 can be a permanent, internal storage device such as ROM. A computer program 100 stored on the storage device is downloaded along with other data from a portable recording medium 90 such as a DVD or CD-ROM via a portable disk drive 16. When executed, it is developed from the storage device 13 in the memory 12 and executed. A computer program may also be downloaded from an external computer connected via a communication interface 17.

The communication interface 17 is connected to the internal bus 18, and can be used to exchange data with an external computer via an external network such as the internet, a local area network (LAN) or a wide area network (WAN).

The I/O interface 14 is connected to the touch panel 21 and receives entered data. The video interface 15 connects the touch panel 21 with the integrated display 22 and displays images of objects. During normal object selection, the touch panel 21 may be integrated with the display 22. Even though the touch panel 21 and the display 22 are separate, they do not inhibit the functions of the object indicating mechanism. The user indicates and selects objects displayed on the display 22.

Figure 2:
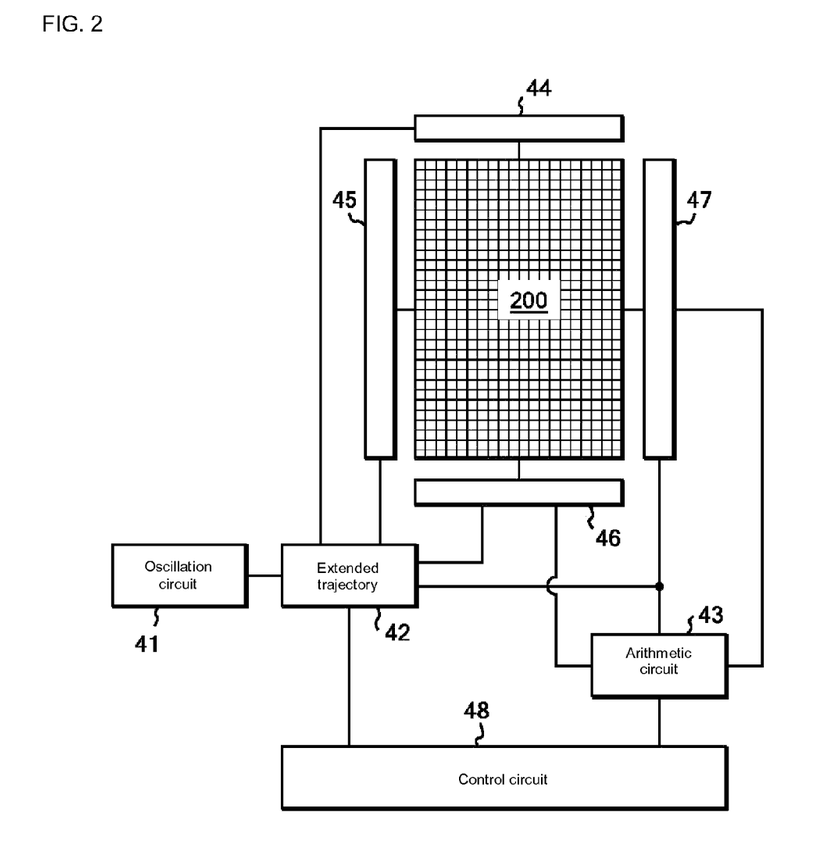
FIG. 2 is a block diagram showing the configuration of the touch panel 21 in an embodiment.

FIG. 2 is a block diagram showing the configuration of the touch panel 21 in an embodiment. As shown in FIG. 2, the touch panel 21 in the embodiment includes a touch panel unit (display) 200, an oscillation circuit 41, a detection position control circuit 42, an arithmetic circuit 43, X-axis input switch 44, Y-axis input switch 45, X-axis output switch 46, Y-axis output switch 47, and a control circuit 48.

FIG. 2 shows a typical touch panel structure, but any other method common in the art can be used. In addition to the matrix switch method, position detecting methods that can be used in the touch panel 21 include resistance film method, surface acoustic wave method, infrared method, electromagnetic induction method, capacitance method, or a combination thereof. When the capacitance method is used, contact with other points can be detected in addition to measuring the distance using the electrostatic capacitance of the touch panel and a finger or pointer.

The touch panel unit 200 includes a touch panel in which X-axis electrode wires used to detect a position on the X-axis and Y-axis electrode wires used to detect a position on the Y-axis are arranged to form a matrix. The oscillation circuit 41 generates pulse signals. The detection position control circuit 42 controls the connections between X-axis electrode wires or Y-axis electrode wires in the touch panel unit 200.

The arithmetic circuit 43 detects signals from the touch panel unit 200, and calculates the position of finger contact or approximate contact. The X-axis input switch 44 is used to input pulse signals to the input end of the X-axis electrode wires, and the Y-axis input switch 45 is used to input pulse signals to the input end of the Y-axis electrode wires. The X-axis output switch 46 is used to connect the output end of the X-axis electrode wires to the arithmetic circuit 43, and the Y-axis output switch 47 is used to connect the output end of the Y-axis electrode wires to the arithmetic circuit 43.

The control circuit 48 controls all of the operations of the touch panel 21, and instructs the detection position control circuit 42 to detect the position of finger contact or approximate contact when a plurality of electrodes are connected. During position detection, an instruction is given to connect the electrode near the detected position, and connect a predetermined number of electrodes.

When information related to contact, near contact or removal of a finger is acquired as output signals from the touch panel 21, the distance between a finger and the touch panel 21 can be estimated based on fluctuations in electrostatic voltage. The angle of inclination of the moving finger can also be estimated.

Figure 3:
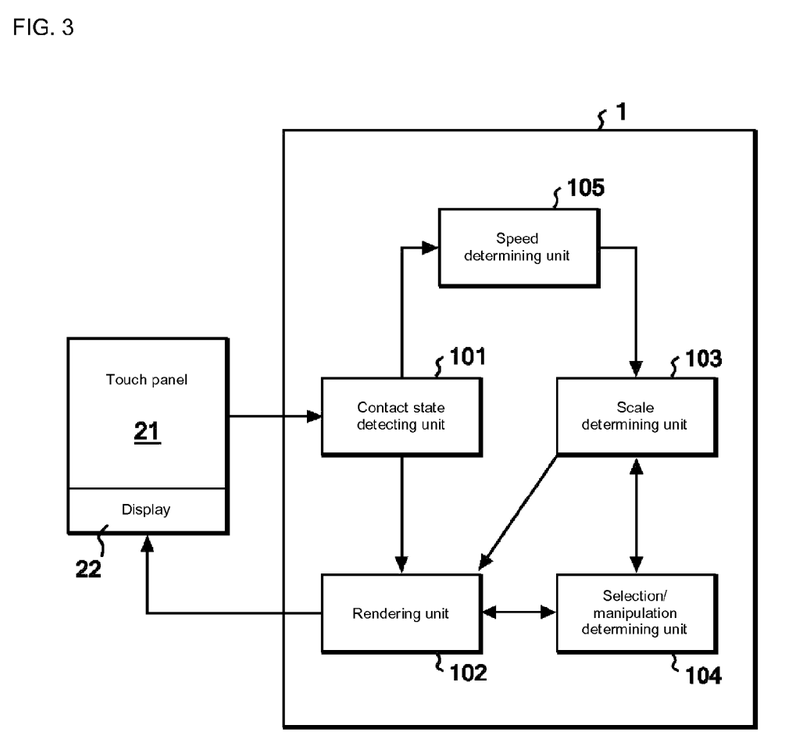
FIG. 3 is a block diagram showing the functions of the information processing device 1 in an embodiment.

FIG. 3 is a block diagram showing the functions of the information processing device 1 in an embodiment. In FIG. 3, the contact state detecting unit 101 in the information processing device 1 receives output signals from the touch panel 21, and extracts information related to the perpendicular distance between a fingertip and the touch panel 21, and related to the contact state of the finger. Information related to the contact state of a finger can be information related to contact, near contact or detachment. This can be determined using output signals from each sensor in the touch panel 21. When a finger is close to making contact, the distance can be calculated using the electrostatic capacitance between the finger and the touch panel.

When contact with a finger has been detected by the contact state detecting unit 101 and the finger begins to move, the signals are sent to the speed determining unit 105. If necessary, a rendering unit 102 can be instructed to render an object and the finger trajectory.

The rendering unit 102 renders an object on the display 22 in response to information related to contact with a finger, the moving speed of the finger and the selection operation. For example, when the speed of the moving finger exceeds a predetermined speed, an instruction is sent from the scale determining unit 103 to render the extended trajectory of the finger on the display 22. The display attributes of the object can also be changed based on the selection operation being performed. Display attributes include color, shape, flashing and brightness.

When the moving speed of the finger measured by the speed determining unit 105 exceeds a predetermined speed, the scale determining unit 103 determines that the extended trajectory mode is required, extends the trajectory of the finger, and instructs the rendering unit 102 to extend and render the finger trajectory in accordance with the moving speed of the finger. Here, the predetermined moving speed can be, for example, 5 meters per second. Information on the moving finger is sent to the selection/manipulation determining unit 104.

The selection/manipulation determining unit 104 selects and manipulates objects based on finger movement information sent from the scale determining unit. If necessary, it sends object rendering instructions to the rendering unit 102.

In an embodiment, the moving speed of a finger is used to determine whether or not the extended trajectory mode is required. However, other signals may be used as criteria for this determination in addition to the moving speed of a finger. For example, pressure applied to a predetermined position on the touch panel can also be used as a determination criterion. Also, an external hardware or software switch may be turned on. Another criterion could be the output of sensor information in the form of specific signals.

Figure 4:
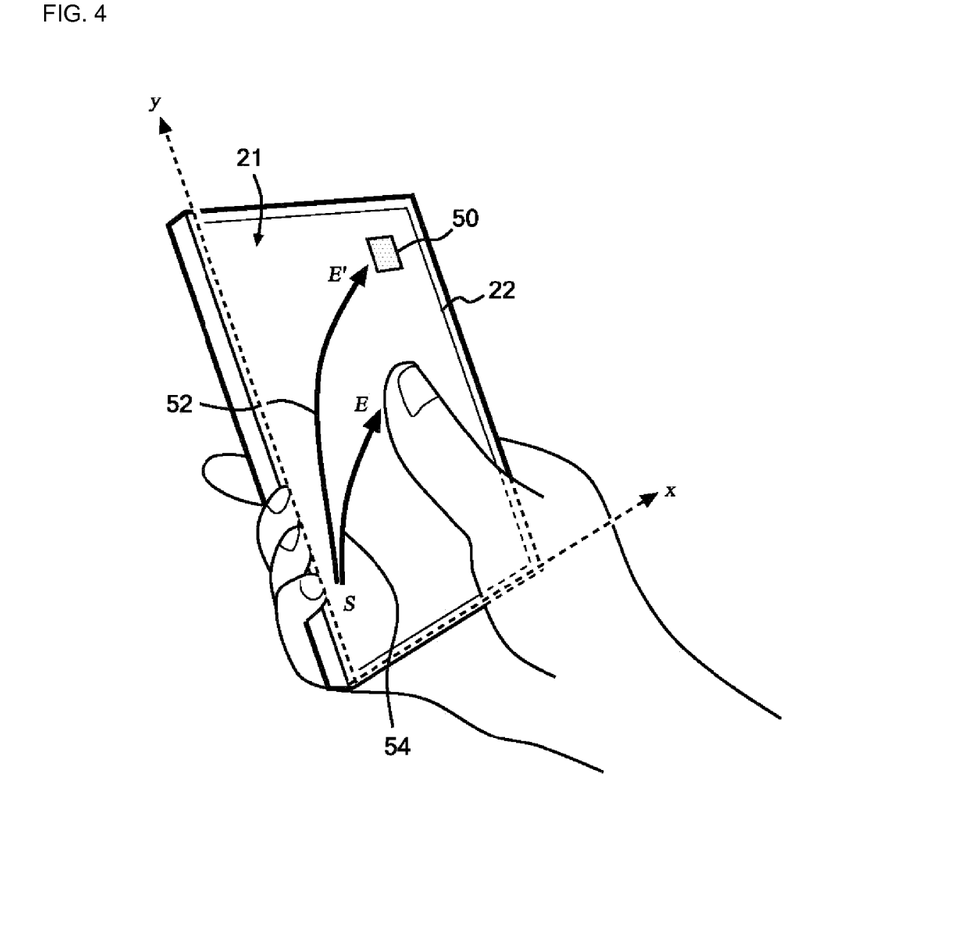
FIG. 4 is a perspective view of the user using a thumb to operate an information processing device according to an embodiment.

FIG. 4 is a perspective view of the user using a thumb to operate the information processing device 1 in an embodiment. Here, the user wants to select an object 50 displayed in an unreachable section of the display 22. The user touches the touch panel and slides the thumb from the start point S towards an end point E. An aspect is that a finger trajectory extension mode is entered when the moving speed of the finger exceeds a predetermined speed. The extended finger trajectory 52 is displayed from start point S to end point E' on the display 22. The scale of the trajectory is extended in response to the speed of the moving finger. The extended trajectory 52 may be displayed along with the moving finger trajectory 54 (start point S, end point E).

The following is an explanation of the method used to render the moving speed and trajectory 52. The moving speed v is expressed by EQ. 1, where Vx is the moving speed in the x-axis direction and Vy is the moving speed in the y-axis direction.

$$v=\sqrt{(Vx^2+Vy^2)} \qquad \text{(EQ. 1)}$$

Next, the coordinates (X, Y) to be rendered next on the trajectory 52 are expressed by EQ. 2 and EQ. 3, where C is a predetermined moving speed and the moving speed of the finger is v>C. When v≤C, that is, when the user's finger is moving slowly, the extended trajectory mode is not entered.

$$X=X'+a \cdot Vx/Cx \text{ (when } |Vx|>Cx) \qquad \text{(EQ. 2)}$$

$$Y=Y'+a \cdot Vy/Cy \text{ (when } |Vy|>Cy) \qquad \text{(EQ. 3)}$$

Here, coordinates (X', Y') are the point coordinates right in front of the trajectory 52. Also, a is a scaling coefficient representing the overall magnification factor of the extended trajectory. Cx and Cy are positive fixed values applied to a specific scaling factor in both axial directions. More specifically, Cx represents a predetermined limiting speed in the x-axis direction, and Cy represents a predetermined limiting speed in the y-axis direction. These coordinate values are calculated when these limiting speeds are exceeded.

The moving speeds Vx, Vy in the axial directions may be negative values. Also, the method used here to calculate the trajectory coordinates is merely an example. Other methods can be used.

Figure 5:
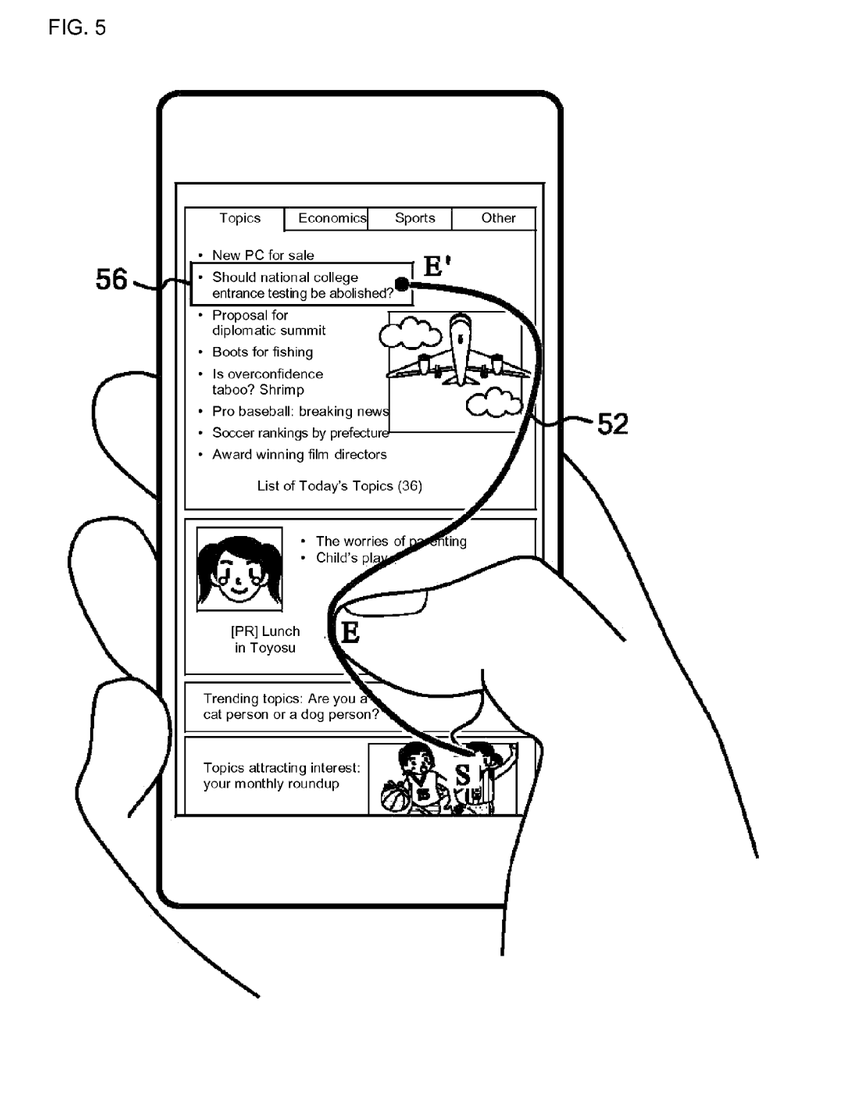
FIG. 5 is an example of an embodiment of object selection being used on a smartphone.

FIG. 5 is an example of an embodiment being used on a smartphone. When the thumb is moved quickly from start point S to end point E, an extended trajectory 52 from start point S to end point E' is displayed in accordance with the moving speed of the thumb. When an object 56 is present at end point E', the object is selected. Alternatively, the object closest to end point E' can be selected and the extended trajectory corrected accordingly.

Figure 6:
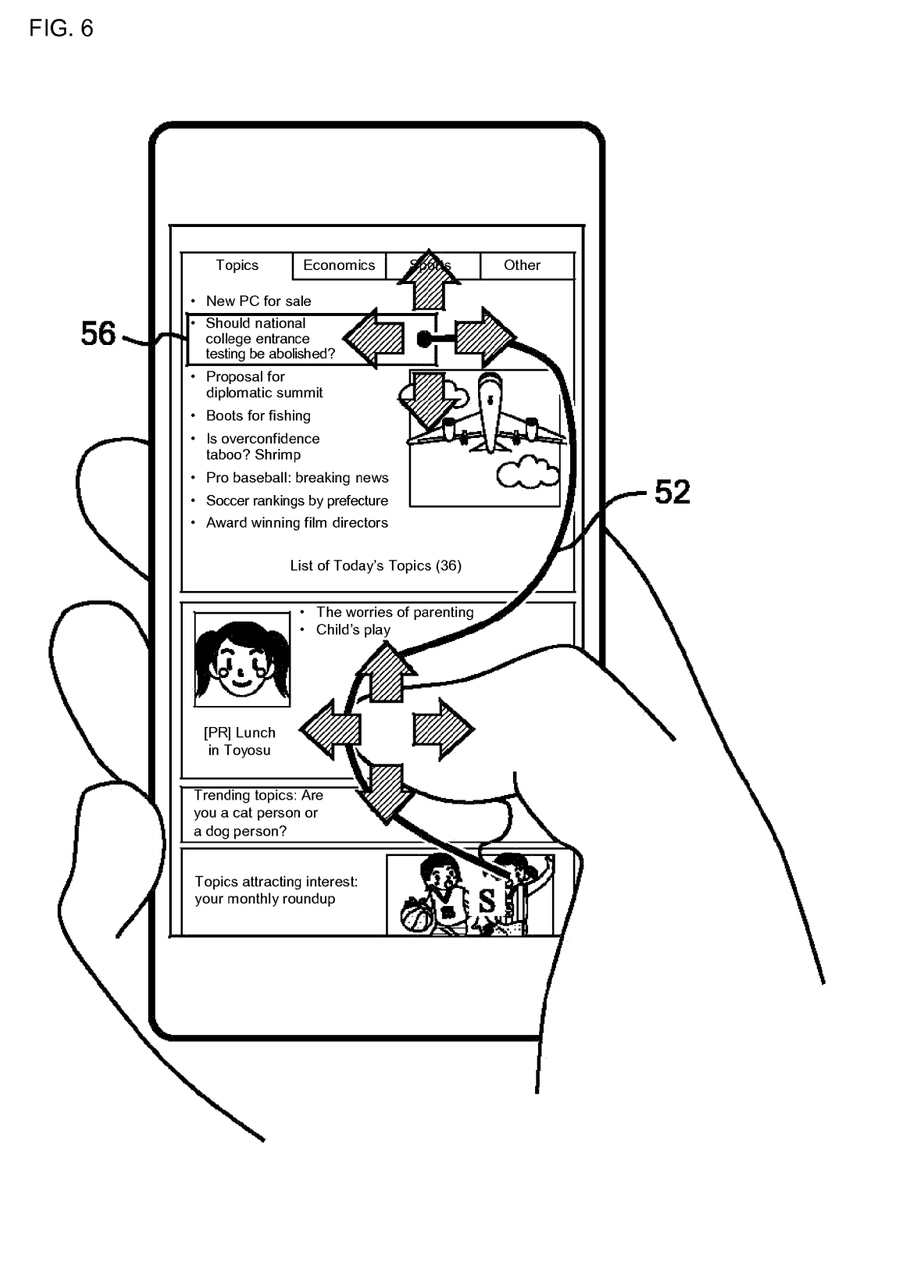
FIG. 6 is a diagram showing an embodiment of a method for making fine adjustments to an extended trajectory.

FIG. 6 is a diagram showing the method for making fine adjustments to an extended trajectory. When the finger on the touch panel continues to move after the state shown in FIG. 5, the position of end point E' in the extended trajectory that is rendered undergoes fine adjustment as shown in FIG. 6. The extended trajectory is rendered again each time the position of the end point E' is moved. The object present at the position of the end point E' is then selected.

Figure 7:
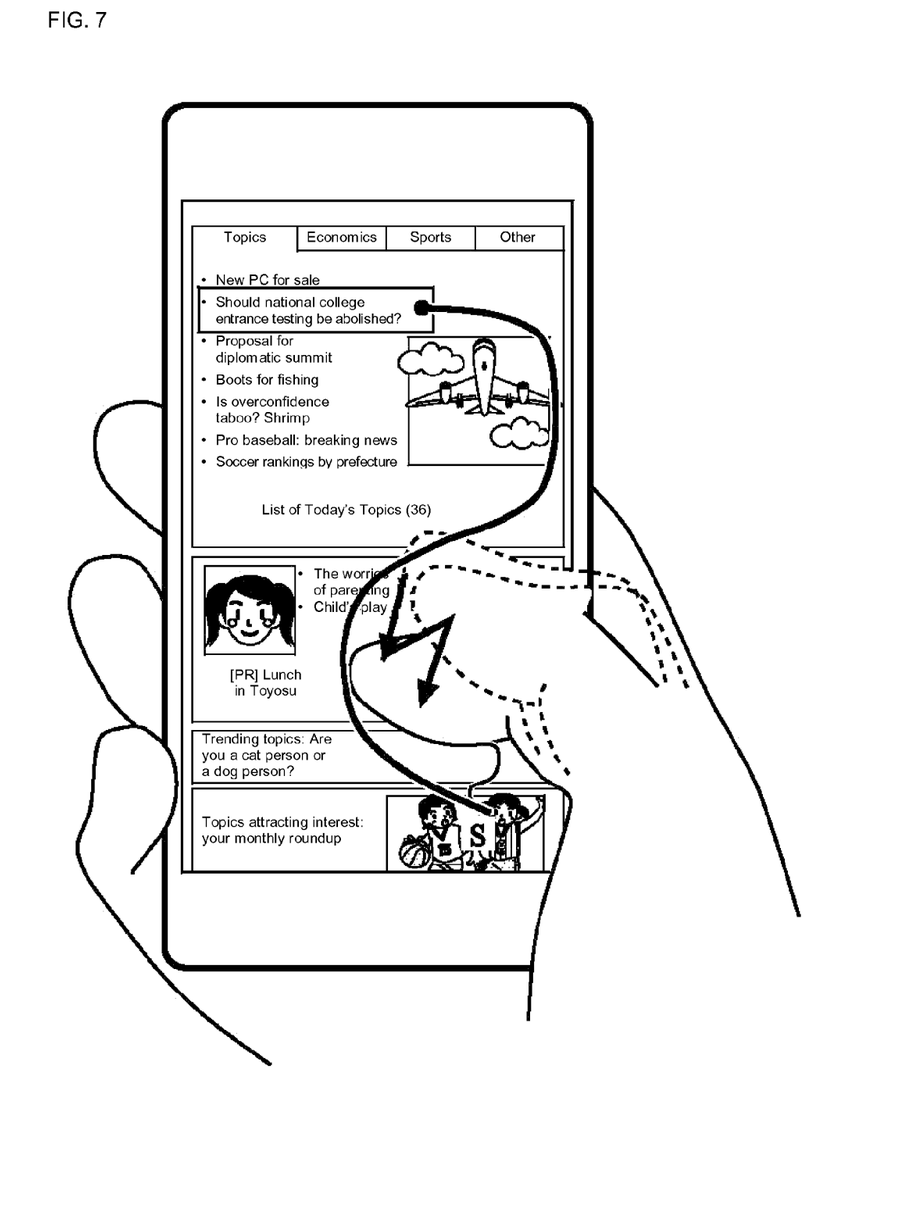
FIG. 7 is a diagram showing an example of object selection.

FIG. 7 is a diagram showing an example of object selection. When the user's finger is removed after the state shown in FIG. 6 and the touch panel is tapped, the object selection is finalized.

Figure 8:
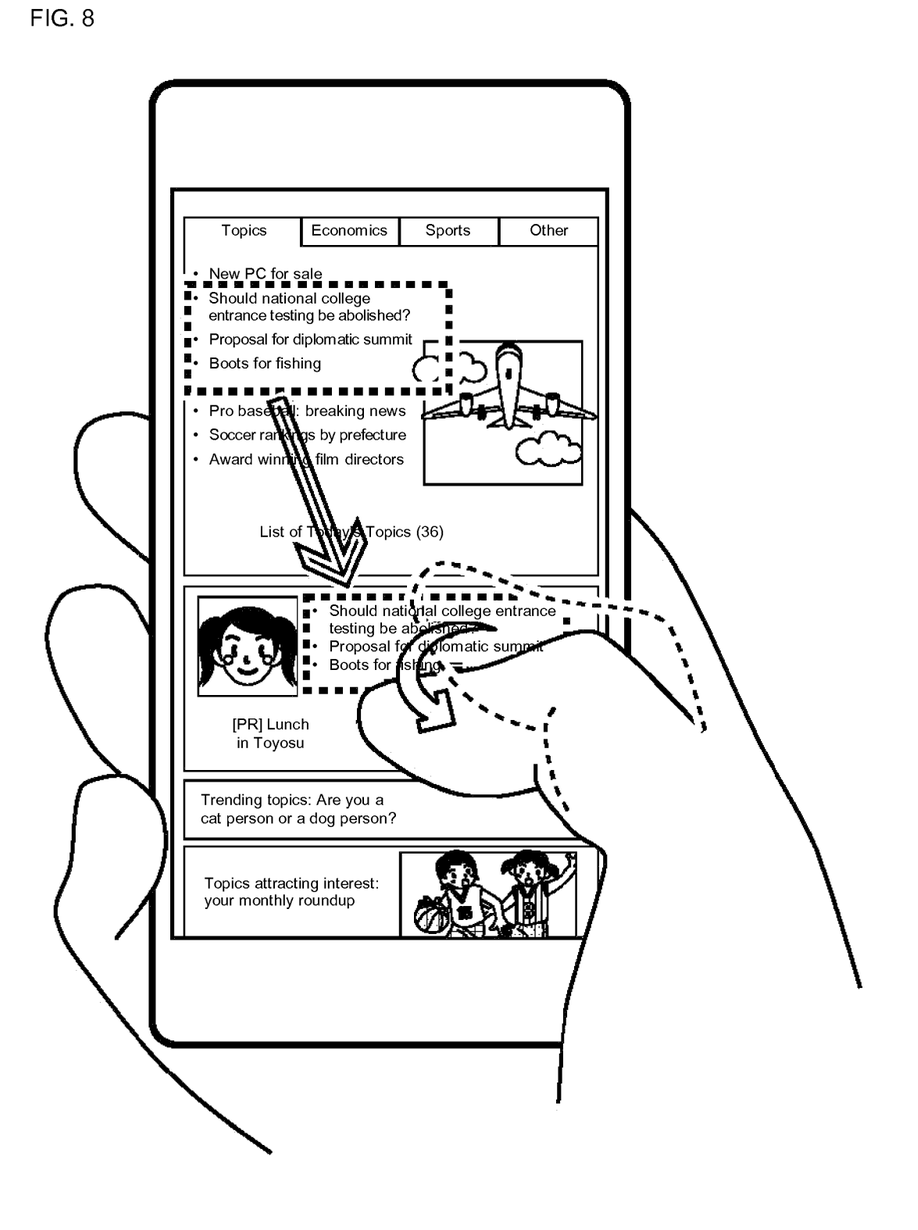
FIG. 8 is a diagram showing an example of range dragging.

FIG. 8 is a diagram showing an example of range dragging. When a finger is used to perform a dragging operation after the fine adjustment made in FIG. 6, the region surrounding the end point E' is extracted and displayed in the foreground (in a region that can be moved by the thumb in FIG. 8). The dragging operation and fine adjustment operation can be determined based on the speed of the moving thumb. When the thumb is moved at a speed exceeding a default speed, a dragging operation is recognized. The size of the extracted region may be determined beforehand to take into account the size of a region that can be moved using a finger.

An object can also be selected within the region that has been dragged in the foreground. When dragged again, the extracted region may be enlarged or reduced in size.

Figure 9:
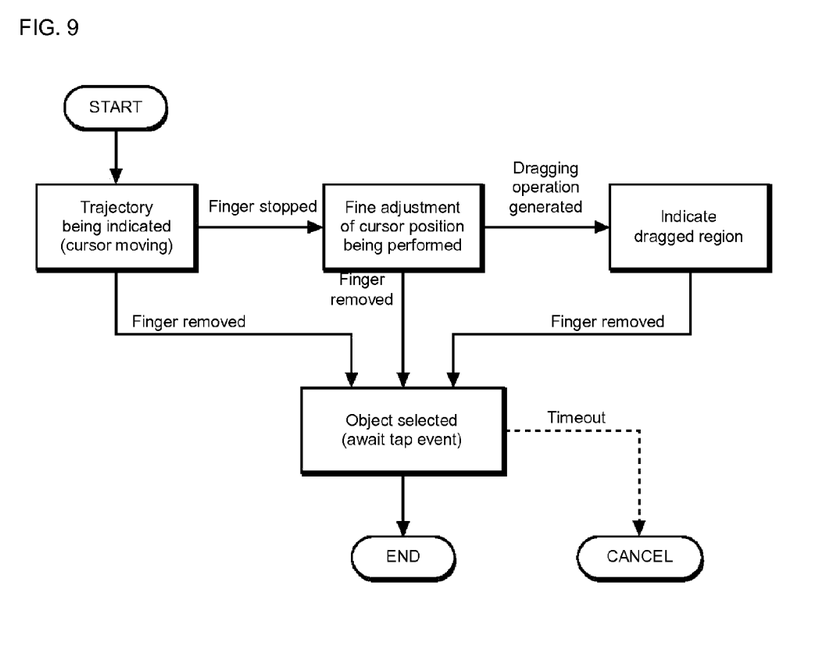
FIG. 9 is a state transition diagram of an embodiment in trajectory extension mode.

FIG. 9 is a state transition diagram of an embodiment in trajectory extension mode. Here, there are four states: trajectory indication, cursor fine adjustment, dragged region display, and object selection. Here, cursor means the end point E' of the extended trajectory. When the finger stops during trajectory indication, fine adjustment to the cursor position is performed. When the dragging operation is performed, dragged region display occurs. In each state, an object is selected when the finger is removed from the touch panel. Object selection is finalized when the screen is tapped, and the trajectory extension mode is ended.

Figure 10:
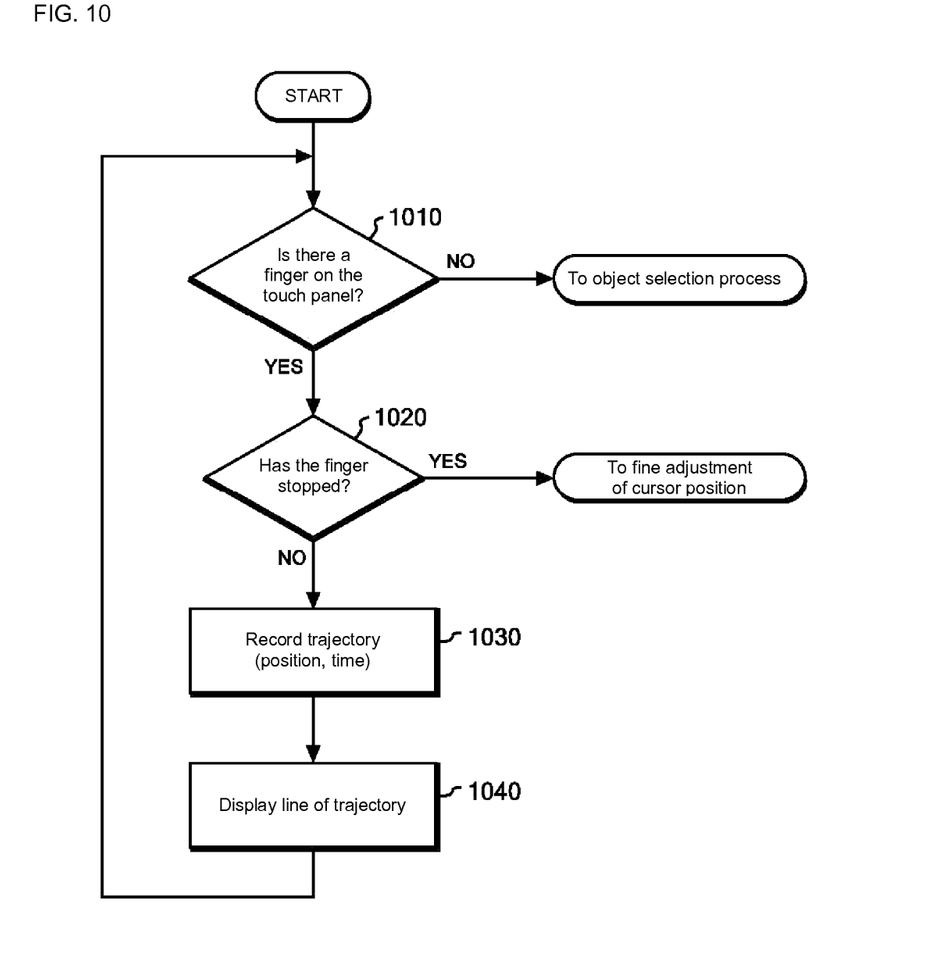
FIG. 10 is a flowchart of an embodiment of a process performed during indication of the trajectory.

FIG. 10 is a flowchart of the process during indication of the trajectory. First, in block 1010, it is determined whether or not a finger is on the touch panel. When the finger is removed from the touch panel, the process proceeds to object selection. When the determination in block 1010 is YES, it is determined in block 1020 whether or not the moving finger has stopped. When the finger has stopped, the process proceeds to object selection.

When the determination in block 1020 is NO, the trajectory is recorded in block 1030. After movement, the cursor position, that is, the coordinates (X', Y') are calculated, and the position and time are recorded. Next, in block 1050, the extended trajectory is displayed. The process then proceeds to block 1010.

Figure 11:
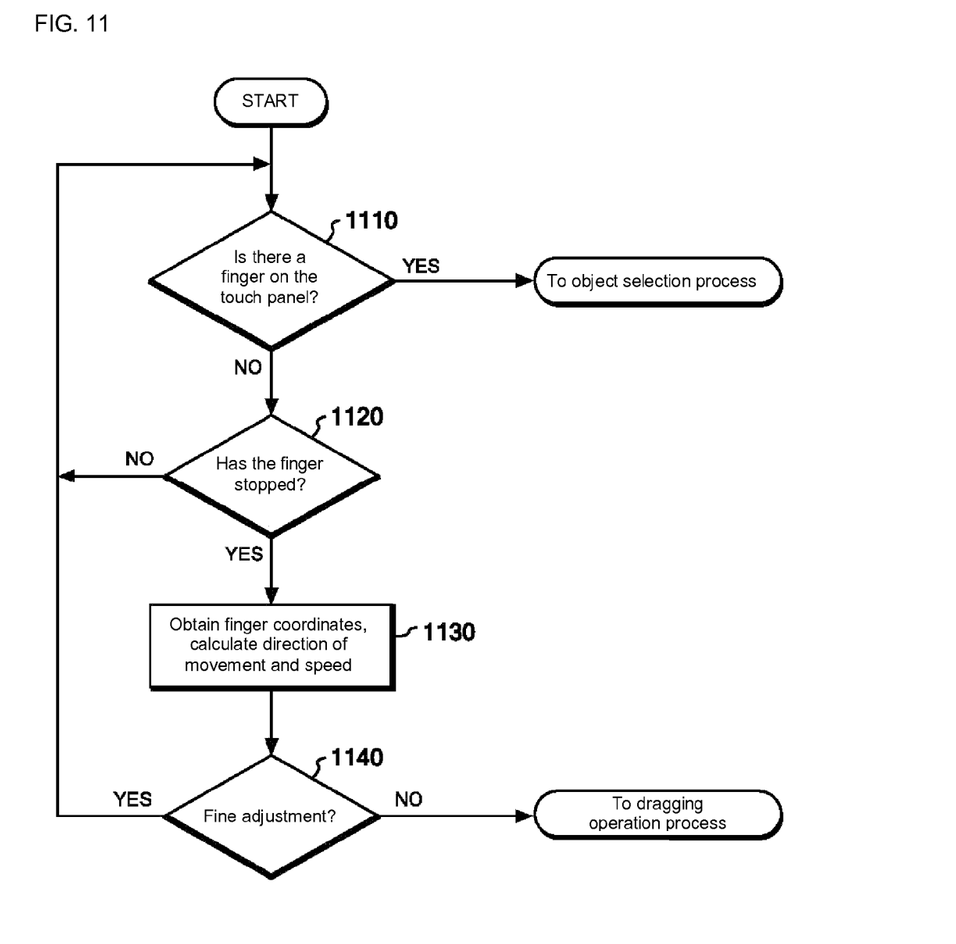
FIG. 11 is a flowchart of an embodiment of a process of making fine adjustments to the position of the cursor.

FIG. 11 is a flowchart of the process of making fine adjustments to the position of the cursor. First, in block 1110, it is determined whether or not a finger is on the touch panel. When a finger is on the touch panel, the process proceeds to object selection. When the determination in block 1110 is NO, it is determined in block 1120 whether or not the finger is moving. When the finger is not moving, the process returns to block 1110.

When the determination in block 1120 is YES, the finger coordinates, moving direction, and moving speed are calculated in block 1130. Next, in block 1150, when the acquired moving speed exceeds a predetermined value, it is determined that a dragging operation is being performed, and the process proceeds to the dragging operation. In addition to the moving speed exceeding a threshold value, other criteria may be movement towards the trajectory starting point or movement towards a lower corner (foreground) of the touch panel.

Figure 12:
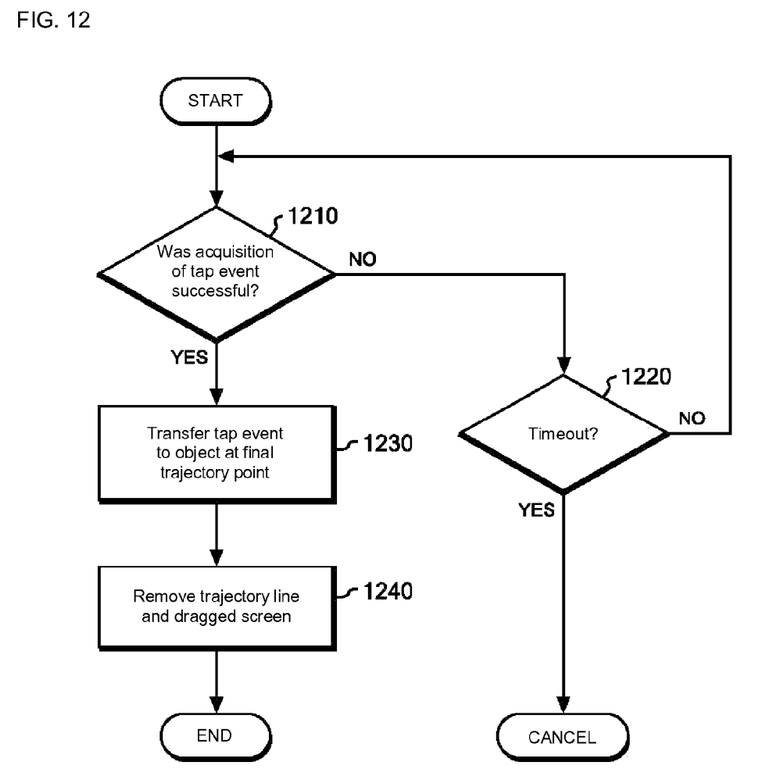
FIG. 12 is a flowchart of an embodiment of a process of object selection.

FIG. 12 is a flowchart of the process of object selection. First, in block 1210, it is determined whether or not acquisition of a tapping event was successful. When unsuccessful, it is determined in block 1220 whether or not there should be a timeout. When a timeout is called, the trajectory extension mode is canceled. When a timeout is not called, the process returns to block 1210.

When acquisition of a tapping event was successful in block 1210, the tapping even in block 1230 is transferred to the object at the trajectory end point. This finalizes the object selection. Next, in block 1250, the extended trajectory or dragged region display is canceled, and the extended trajectory mode is ended.

Figure 13:
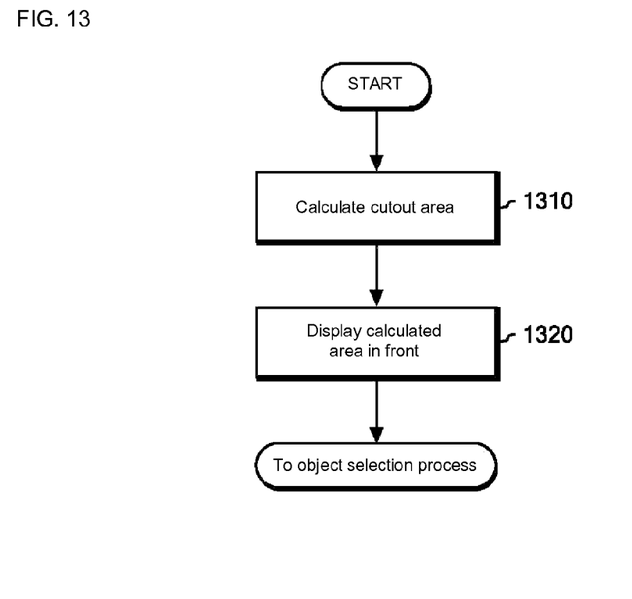
FIG. 13 is a flowchart of an embodiment of a process of range dragging and display.

FIG. 13 is a flowchart of the process of range dragging and display. First, in block 1310, the extraction range is calculated. Next, in block 1320, the calculated range is displayed in the foreground. The process then proceeds to the object selection process.

Figure 14:
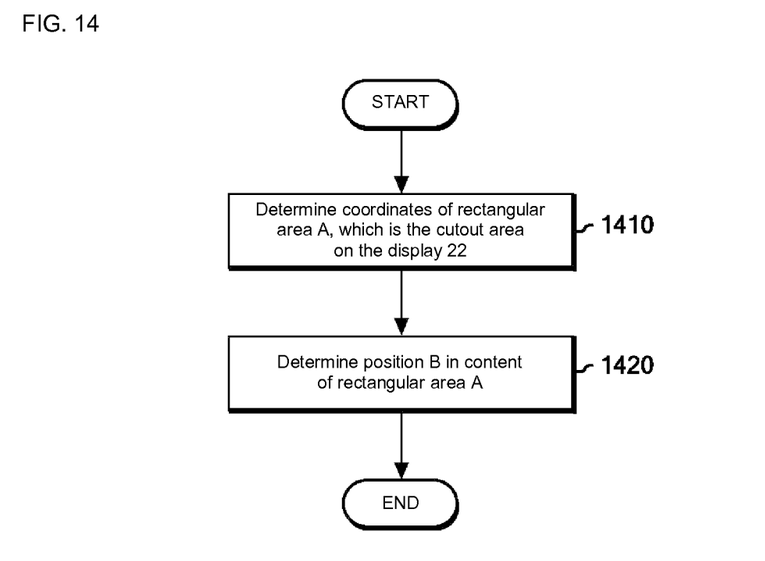
FIG. 14 is a more detailed flowchart of an embodiment of the process in Block 1310 of FIG. 13.

FIG. 14 is a more detailed flowchart of the process in block 1310. First, in block 1410, the coordinates of the extracted range (rectangular region A) on the display 22 are determined. The vertical and horizontal size of the window to be displayed in the foreground is then determined from the coordinates.

Next, in block 1420, position B inside the content of rectangular region A is determined. When the display area of the display 22 is small, such as in the case of a smartphone, only some of the content may be displayed. The position of content in rectangular region A is acquired as position B.

Figure 15:
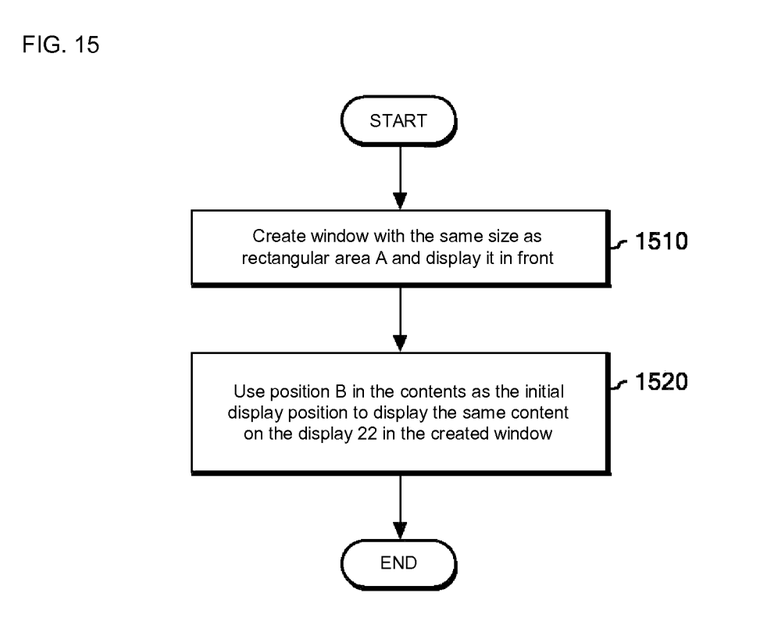
FIG. 15 is a more detailed flowchart of an embodiment of the process in Block 1320 of FIG. 13.

FIG. 15 is a more detailed flowchart of the process in block 1320. First, in block 1510, a window the same size as rectangular region A is created in the foreground.

Next, in block 1520, the same content displayed on display 22 is displayed inside the created window. At this time, the display start position inside the window is used to display the content from position B. In this way, the same content is displayed inside the window in the foreground, and the same object selection process can be performed inside the window after object dragging.

The present invention may be a system, a method, and/or a computer program product. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:
1. A method for selecting an object to display from an information processing device connected in a manner enabling an exchange of data to a touch panel having a display function, the method comprising:
 entering a trajectory extension mode in response to a user moving a finger over the touch panel at a speed equal to or greater than a predetermined speed;

extending and displaying a trajectory of the finger in response to the speed of the moving finger detected in the trajectory extension mode; and placing an object located at an end point of the extended trajectory on the touch panel in a selected state.

2. The method according to claim 1 further comprising making fine adjustments to the end point of the trajectory in response to further movement of the user's finger over the touch panel while in the selected state.

3. The method according to claim 2 further comprising extracting a region for the end point of the trajectory and displaying the region near the finger in response to a dragging operation performed by the user's finger after fine adjustment, wherein the region is an area determined by a size of accessibility by the finger.

4. The method according to claim 1, wherein the displaying includes the trajectory of the finger in the extended trajectory.

5. A device for selecting an object to display from an information processing device connected in a manner enabling an exchange of data to a touch panel having a display function, the device configured for:

entering a trajectory extension mode in response to a user moving a finger over the touch panel at a speed equal to or greater than a predetermined speed;

extending and displaying a trajectory of the finger in response to the speed of the moving finger detected in the trajectory extension mode; and placing an object located at an end point of the extended trajectory on the touch panel in a selected state.

6. The device according to claim 5 further configured for making fine adjustments to the end point of the trajectory in response to further movement of the user's finger over the touch panel while in the selected state.

7. The device according to claim 6 further configured for extracting a region for the end point of the trajectory and displaying the region near the finger in response to a dragging operation performed by the user's finger after fine adjustment, wherein the region is an area determined by a size of accessibility by the finger.

8. The device according to claim 5, wherein the displaying comprises coordinating the trajectory of the finger with the extended trajectory.

9. A computer program product for selecting an object to display from an information processing device connected in a manner enabling an exchange of data to a touch panel having a display function, the computer program product comprising a non-transitory computer readable storage medium having program instructions embodied therewith, the program instructions executable by a processor to cause the processor to:

enter a trajectory extension mode in response to a user moving a finger over the touch panel at a speed equal to or greater than a predetermined speed;

extend and display a trajectory of the finger in response to the speed of the moving finger detected in the trajectory extension mode; and place an object located at an end point of the extended trajectory on the touch panel in a selected state.

10. The computer program product according to claim 9 further comprising making fine adjustments to the end point of the trajectory in response to further movement of the user's finger over the touch panel while in the selected state.

11. The computer program product according to claim 10 further comprising extracting a region for the end point of the trajectory and displaying the region near the finger in response to a dragging operation performed by the user's finger after fine adjustment, wherein the region is an area determined by a size of accessibility by the finger.

12. The computer program product according to claim 9, wherein the displaying includes the trajectory of the finger in the extended trajectory.

13. A method for selecting an object to display from an information processing device connected in a manner enabling an exchange of data to a touch panel having a display function, the method comprising:

entering a trajectory extension mode in response to a user moving a finger over the touch panel at a speed equal to or greater than a predetermined speed;

extending and displaying a trajectory of the finger in response to the speed of the moving finger detected in the trajectory extension mode, wherein the displaying a trajectory of the finger comprises an overlay of a line showing the trajectory of the finger on the touch panel having a display function; and placing an object located at an end point of the extended trajectory on the touch panel in a selected state.

\* \* \* \* \*